No. 801,298. PATENTED OCT. 10, 1905.
C. S. CARNAHAN.
GATE.
APPLICATION FILED APR. 29, 1905.
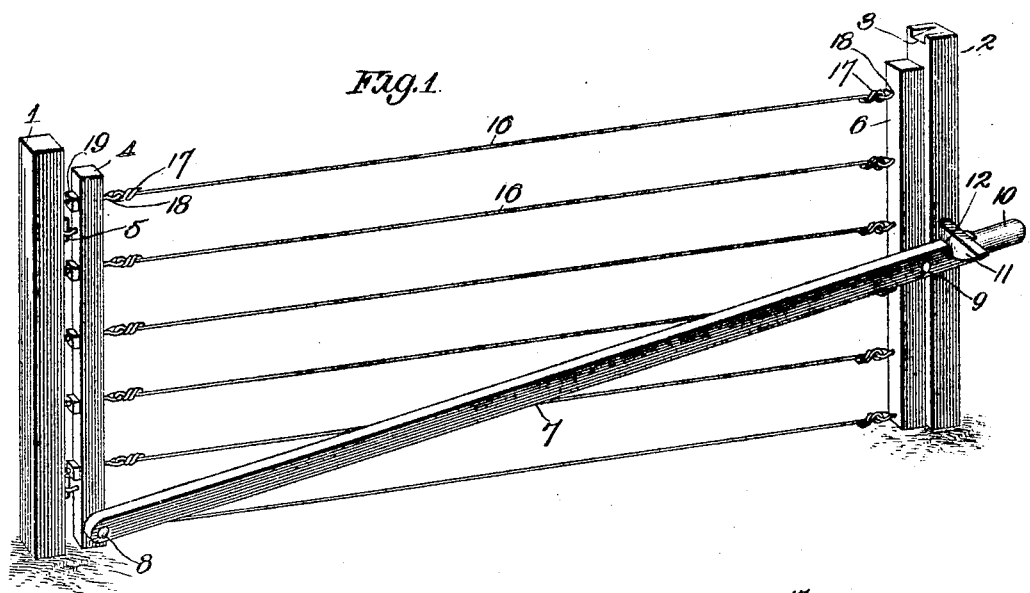
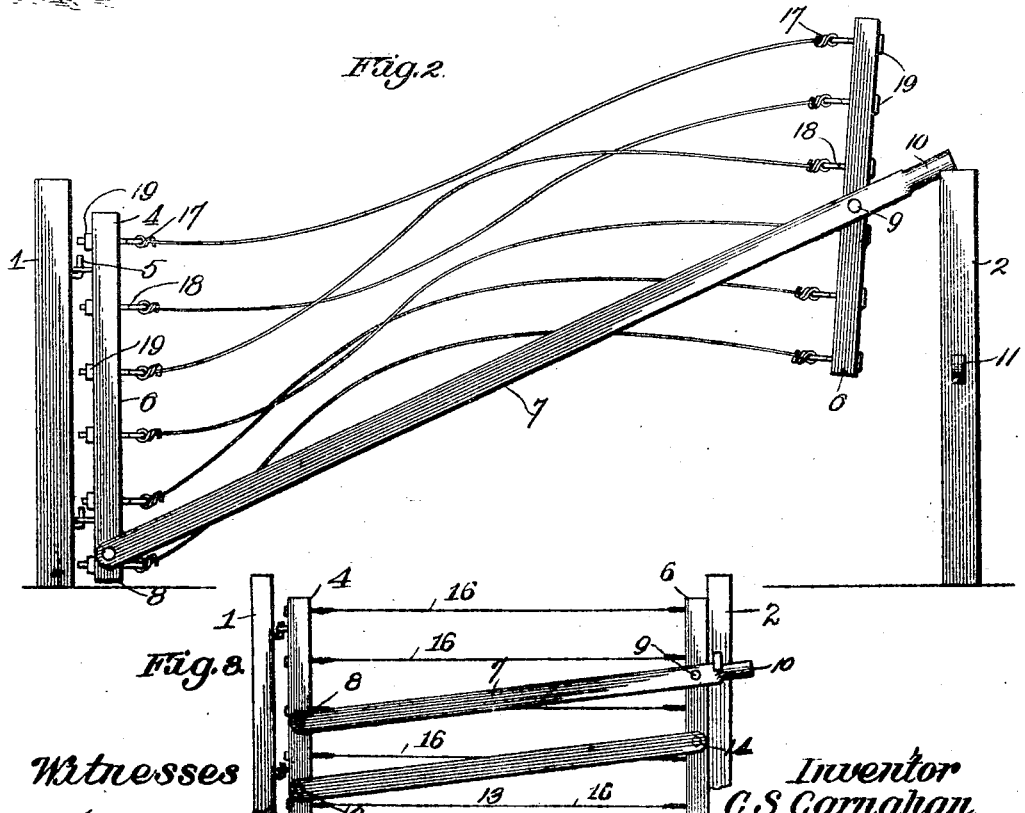
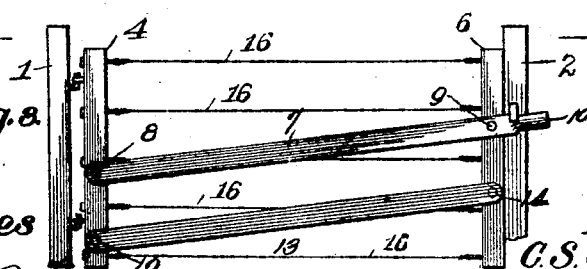
Witnesses
Frank R. Slow.
H. C. Rodgers
Inventor
C. S. Carnahan
By George J. Korpi
atty.

UNITED STATES PATENT OFFICE.

CHARLES S. CARNAHAN, OF McLOUTH, KANSAS.

GATE.

No. 801,298. Specification of Letters Patent. Patented Oct. 10, 1905.

Application filed April 29, 1905. Serial No. 258,126.

*To all whom it may concern:*

Be it known that I, CHARLES S. CARNAHAN, a citizen of the United States, residing at McLouth, in the county of Jefferson and State of Kansas, have invented certain new and useful Improvements in Gates, of which the following is a specification.

This invention relates to gates; and my object is to produce a thoroughly efficient and practical gate of exceedingly simple, strong, durable, and cheap construction.

To this end the invention consists in certain novel and peculiar features of construction and organization, as hereinafter described and claimed, and in order that it may be fully understood reference is to be had to the accompanying drawings, in which—

Figure 1 is a perspective view of a gate embodying my invention. Fig. 2 is a side view of the gate in a position which it may occupy when it is desired to drive hogs, sheep, and other small stock from one field to another. Fig. 3 is a side view, on a smaller scale, of the type of gate which will preferably be employed on fences for inclosures containing cattle, horses, mules, &c.

In the said drawings, 1 indicates the hinge-post of a fence of any character, and 2 the latch-post of such fence, said latch-post being preferably provided with a notch 3 at its upper end.

4 is one end bar of the gate, hinged, as at 5, or in any other suitable manner, to post 1, and 6 is the end bar at the free end of the gate.

7 is an obliquely-extending bar pivoted, as at 8, to the lower end of bar 4, and pivoted, as at 9, to bar 6 midway its length, bar 7 having a handle extension 10 projecting beyond bar 6 and adapted to engage the under side of a shoulder or latch-bar, said shoulder being preferably in the form of a notch 12 of the rigid latch-bar 11, said latch-bar being preferably beveled downwardly from its outer end to said notch, as shown.

If the gate is for a fence inclosing a field containing cattle or other large stock, I will preferably employ a second oblique bar 13. In this case bar 7 may be pivoted to bar 4 at any desired point, but be pivoted to bar 6 above its center, and bar 13 will parallel bar 7—that is to say, its end will be pivoted, as at 14, to bar 6 at the same distance below the center of the latter that bar 7 is pivoted above said center, the opposite end of bar 13 being pivoted, as at 15, to bar 4.

In either type of construction described the bars 4 and 6 will be connected by a flexible connection which preferably will be in the form of a series of parallel wires 16, or said flexible connection may be of woven wire, or again the flexible connection may be provided with vertical pickets or slats. (Not shown.) For gates for inclosures containing stock of any kind the flexible connection will also preferably be provided with barbs to deter the stock from rubbing up against the gate.

In any type of construction the distance between bars 4 and 6 when the gate is closed should be equal in order that said connection shall be uniformly tensioned, and where the connection is in the form of independent wires, as shown in the drawings, I provide means for adjusting them longitudinally in order that they may be brought to the same tension with a minimum amount of trouble and loss of time on the part of the person erecting the gate.

In the drawings the wires are secured, as at 17, to alined eyebolts 18, extending through bars 4 and 6, and engaging the threaded ends of said eyebolts are nuts 19, which are screwed upon the eyebolts to tension the wires. Obviously the adjusting operation can take place at one end only of the gate, if desired, as will be understood by reference to Fig. 2, in which it will be noticed that some of the eyebolts project a greater distance beyond the nuts than others at the hinge-post end of the gate.

To open the gate, the operator presses downward upon the handle end of bar 7 until the lower edge of the latch has been cleared. The gate can then be swung open in the usual manner, or where it is desired to drive a number of hogs through the gateway the gate can after bar 7 is disengaged from the latch be raised upward until said handle end clears the top of the post 2, and then said handle end of bar 7 may be lowered until it rests in the notch 3 in the top of said post. One attendant may then stand by post 2, so as to be ready to drop the gate in order to retain any particular hog or hogs in the field should they attempt to pass through with the others, the gate being then raised after said hogs have been turned back, so as to permit others to pass through. It will thus be seen that through this vertical adjustment of the gate stock can be separated in less time and with less trouble than with the ordinary gate which must be operated upon its hinges only. When the gate is raised, the flexible connection will bend, as shown in Fig. 2, or otherwise. In the construction showing only a single oblique bar this vertical raising of the gate may be and usually is accompanied by bar 6 assuming a position out of the perpendicular. With the type of construction employing bars 7 and 13 pivoted to bar 6 at equal distances above and below its center said bar will always maintain its perpendicular position.

With either construction it is obvious that the handle end of the bar can be moved from one side of the latch-post to the other, so that the gate is adapted to open from either side of said post, it being equally obvious that the latch-post may have latch-bars at each side.

From the above description it will be apparent that I have produced a gate embodying the features of advantage enumerated as desirable in the statement of invention and which may obviously be modified in some particulars without departing from the spirit and scope thereof.

Having thus described the invention, what I claim as new, and desire to secure by Letters Patent, is—

1. A gate, comprising a post, a second post having a downwardly-disposed shoulder, a bar connected to the first-named post, a second bar, a flexible connection connecting said bars, and a plurality of parallel oblique bars pivoted to the first-named bar and pivoted to the other bar at equal distances above and below its center, one of said oblique bars having a handle extension to engage the shoulder of the second post.

2. A gate, comprising a hinge-post, a latch-post having a downwardly-disposed shoulder, an end bar hinged to the hinge-post, a second end bar, a flexible connection connecting said end bars, and a plurality of parallel oblique bars pivoted to the first-named bar and pivoted to the other bar at equal distances above and below its center, one of said oblique bars having a handle extension to engage the shoulder of the latch-post.

3. A gate comprising a hinge-post, a latch-post having a shoulder on its side and a notch in its upper end, an end bar connected to the hinge-post, a second end bar, flexible connections between said end bars, and an oblique bar pivoted to said end bars and having an extension adapted to engage under the shoulder on the side of the latch-post or rest in the notch in the upper end of the same.

In testimony whereof I affix my signature in the presence of two witnesses.

CHARLES S. CARNAHAN.

Witnesses:
 H. C. RODGERS,
 G. Y. THORPE.